United States Patent [19]

Dawes et al.

[11] Patent Number: 4,890,098

[45] Date of Patent: Dec. 26, 1989

[54] FLEXIBLE WINDOW MANAGEMENT ON A COMPUTER DISPLAY

[75] Inventors: Antony J. O. Dawes, Berks, Okla.; Stephen R. Henson, Atlanta, Ga.

[73] Assignee: International Business Machines Corporation, Armonk, N.Y.

[21] Appl. No.: 110,293

[22] Filed: Oct. 20, 1987

[51] Int. Cl.$^4$ ............................................. G09G 1/06
[52] U.S. Cl. ................................... 340/721; 340/723; 340/724
[58] Field of Search ............... 340/721, 723, 724, 726; 364/200, 300, 900, 521

[56] References Cited

U.S. PATENT DOCUMENTS

| | | | |
|---|---|---|---|
| 4,542,376 | 9/1985 | Bass et al. | 340/723 |
| 4,574,364 | 3/1986 | Tabata et al. | 364/300 |
| 4,586,035 | 4/1986 | Baker et al. | 340/723 |
| 4,598,384 | 7/1986 | Shaw et al. | 340/721 |
| 4,642,790 | 2/1987 | Minshull et al. | 340/723 |
| 4,651,146 | 3/1987 | Lucash et al. | 340/721 |
| 4,653,020 | 3/1987 | Cheselka et al. | 340/721 |
| 4,670,752 | 6/1987 | Marcoux | 340/724 |
| 4,692,757 | 9/1987 | Tsuhara et al. | 340/724 |
| 4,694,288 | 9/1987 | Harada | 340/721 |
| 4,700,320 | 10/1987 | Kapur | 340/723 |
| 4,710,767 | 12/1987 | Sciacero et al. | 340/723 |
| 4,712,191 | 12/1987 | Penna | 340/721 |

*Primary Examiner*—Gerald Brigance
*Assistant Examiner*—Richard Hjerpe
*Attorney, Agent, or Firm*—Whitham & Marhoefer

[57] ABSTRACT

A technique is described for managing windows in a display system. The window manager allows a user to mark an area on the display to define the dimensions and contents of a resized window. All non-hidden text and attributes within the enclosed area are incorporated into the resized window; however, the original windows do not lose their original characteristics. The marked area may span multiple windows, so multiple windows may be incorporated into the newly resized window. For each position within the newly resized window, a check is made for a window below. If no window exists below this position, the default, or background, character and attribute are incorporated into the newly resized window. If there exists a window below, a determination is made as to whether the window below is visible or hidden. If hidden, the system continues to look for a visible window until no further window is found below, at which point the default character and attribute are incorporated into the newly resized window. When a visible window is found below the newly resized window, the character and attribute from its corresponding position are read and incorporated into the newly resized window. This process continues until all of the information is processed from the marked area. In this manner, a window can be enlarged to incorporate the contents of several windows by enclosing several windows in the marked area.

6 Claims, 4 Drawing Sheets

FLEXIBLE WINDOW MANAGEMENT ON A COMPUTER DISPLAY

BACKGROUND OF THE INVENTION

1. Field of the Invention

This invention generally relates to a computer display system, and more particularly, the invention is directed to a display system which manages the creation, copying and resizing of windows on a graphics display. An interface is provided which allows an operator to interactively mark an area on the display that defines the boundaries of a resized window. Information on the display within the defined area is duplicated in the resized window. This approach facilitates the incorporation of the contents of several windows into a single window.

2. Description Of The Prior Art

The past several years have seen an increase in the usage of workstations performing applications ranging from spreadsheets to graphics. Many of these applications have taken advantage of the newer, more powerful microprocessors and their advanced functions. One of the advanced functions, windowing, allows a single microprocessor system to manage multiple applications for a user.

Microsoft Windows TM is an example of a window manager. Windows TM allows the user to have multiple applications active in multiple windows at the same time. The windows default to occupy preselected areas on the display. The dimensions of a window can be modified by stretching or shrinking the X dimension or the Y dimension using the size command. Copying of information from one window to another window is accommodated by placing a copy of the text into the clipboard and then transferring the clipboard copy of the text to another window. This approach does not provide the user with an easy-to-use technique for combining multiple windows into a single window application. In addition, when a window is initially created, it is displayed in a predefined, rectangular area. The user is not given the opportunity to preselect the dimensions of the window. A further drawback of this approach is that any information copied through the clipboard intermediate storage area technique described above loses any attribute information associated with it.

SUMMARY OF THE INVENTION

It is therefore an object of this invention to provide a window management system that allows a user to create a window of user selectable dimensions on the display.

It is a further object of the invention to allow a user to interactively create a new window that incorporates the contents of a single or multiple, previously created windows.

It is another object of the invention to copy character and attribute information from the contents of the multiple, previously created windows.

It is yet another object of the invention to differentiate between hidden and visible windows and only copy information from a window that is visible.

According to the invention, these objects are accomplished by providing a method of managing windows in a display system. The window manager allows a user to mark an area on the display to define the dimensions and contents of a resized window. All non-hidden text and attributes within the enclosed area are preserved as the contents of the newly resized window. The marked area may span multiple windows, so multiple windows may be incorporated into the newly resized window. For each position within the newly resized window, a check is made to locate a window below. If no window exists below this position, a copy of the default character and attribute are incorporated into the newly resized window. If there exists a window below the resized window, a determination is made as to whether it is visible or hidden. If hidden, the system keeps looking for a visible window below, but if no visible window is found, the default character and attribute are incorporated as before. However, when a visible window is found below the newly resized window, the character and attribute are read from the corresponding position of the visible window and incorporated into the newly resized window. This process continues until all of the information is processed from the marked area. In this manner, a window can be resized to incorporate the contents of several windows by enclosing the several windows in the marked area. At the same time, the several windows which have been incorporated into the resized window also retain a separate and individual identity.

BRIEF DESCRIPTION OF THE DRAWINGS

The foregoing and other objects, aspects and advantages of the invention will be better understood from the following detailed description of the preferred embodiment of the invention with reference to the accompanying drawings, in which.

DETAILED DESCRIPTION OF THE PREFERRED EMBODIMENT OF THE INVENTION

The following disclosure describes a method for the improved management of windows. The disclosed invention is described using an IBM Personal Computer (PC); however, one of ordinary skill in the art will recognize that any computer system that has the capability of displaying graphic information on a display could be substituted for the IBM PC.

Figure 1:
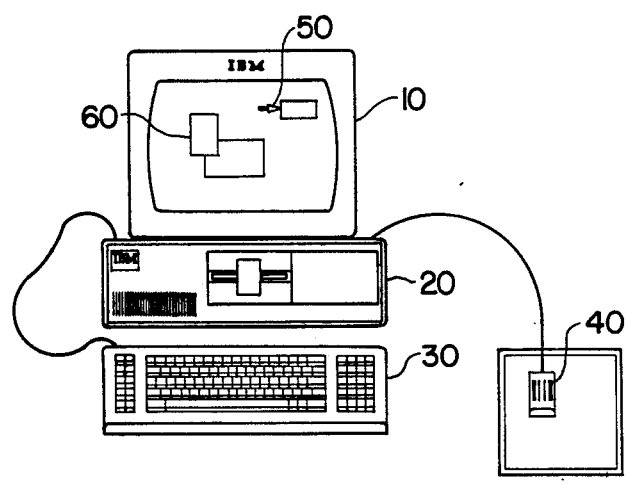
FIG. 1 is an illustration of a typical hardware system environment in which the window manager executes.
Figure 2:
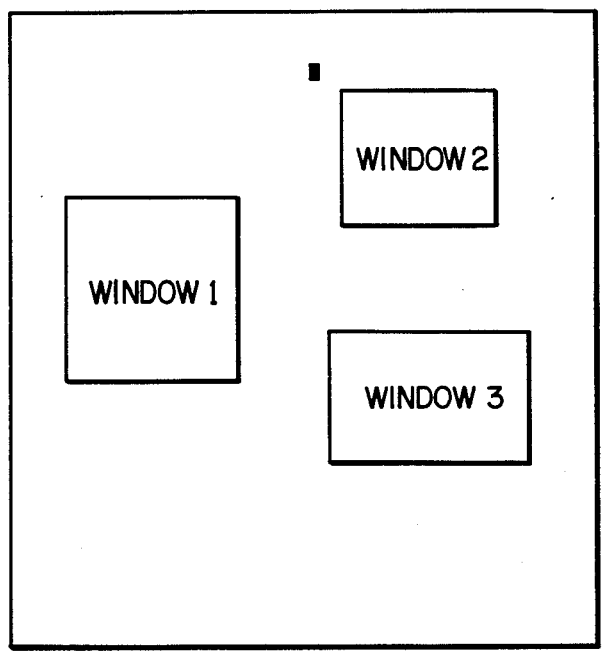
FIGS. 2 to 5 are representations of a computer display with windows illustrating the operation of the present invention.

Referring now to the drawings, and more particularly to FIG. 1, there is an illustration of a typical hardware system environment in which the window manager executes. A graphics display 10 is attached to a Personal Computer 20 which includes an attached keyboard 30 and cursor placement device such as a mouse 40. The mouse 40 could be replaced with a joystick, touch screen or other pointing device and is an optional supplement to the cursor keys on the keyboard 30. The cursor keys on the keyboard 30 and/or mouse 40 are used to position the cursor 50. Multiple windows, such as the window 60, can be displayed on the graphics display 10.

Figure 3:
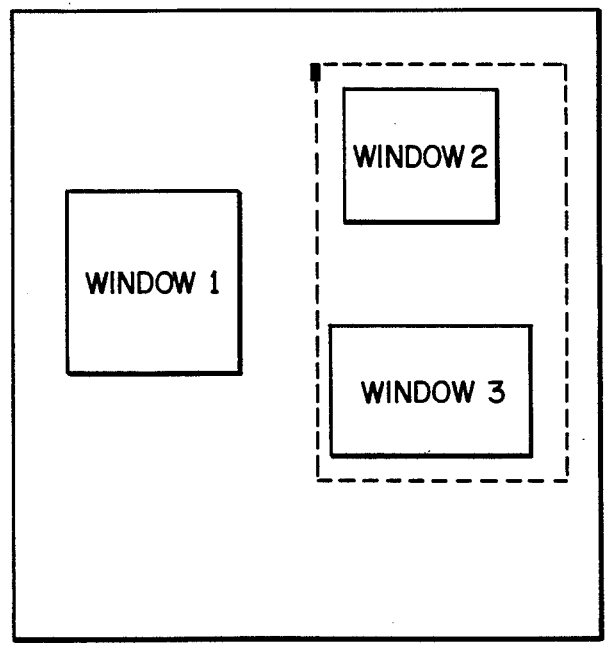

To illustrate the procedure, consider the following example with reference to FIGS. 2 to 5:

A user first selects a window to be resized. In this example, it will be assumed that window 3 is selected by the user. The selection by the user may be done by inputing a resize command and, in response to a prompt, pointing with a cursor to the window to be resized. The user then selects an axis location on the screen as shown by positioning the small, blackened, square cursor in FIG. 2. Once the cursor is positioned, the selection is accomplished by pressing a button on the mouse or a key on the keyboard. Then, a new, transparent, sizing window, as shown in FIG. 3, is created at the point and is made the topmost window on the screen. The transparency of the sizing window allows the user to see the contents of any windows enclosed by the sizing window during the sizing operation. The transparent effect is accomplished by framing the sized area with a border of the sizing window. Another, equally effective approach would be to change the screen attributes of the enclosed area. Then, as the user moves the cursor around the screen, the transparent sizing window stretches and shrinks, like a rubber-band, to enclose the newly sized window.

Figure 4:
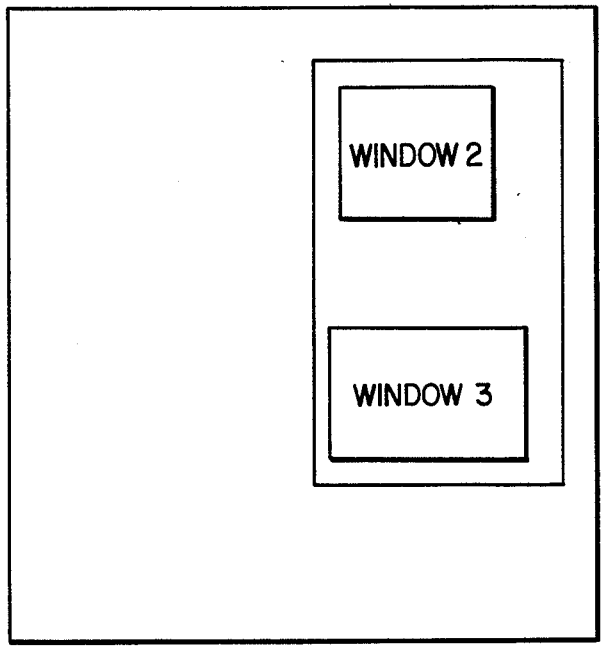

When the user signals the completion of the sizing operation by pressing the mouse button, the data enclosed by the sized boundary is incorporated into the newly sized window. If the locations and dimensions of the newly sized window overlap two other windows as shown in FIG. 4, the new contents of the resized window would include all of the information in the two overlapped windows. This technique allows a user to duplicate the contents of another window by sizing another window over it. FIG. 4 shows the newly sized window as it would appear to a user.

Figure 5:
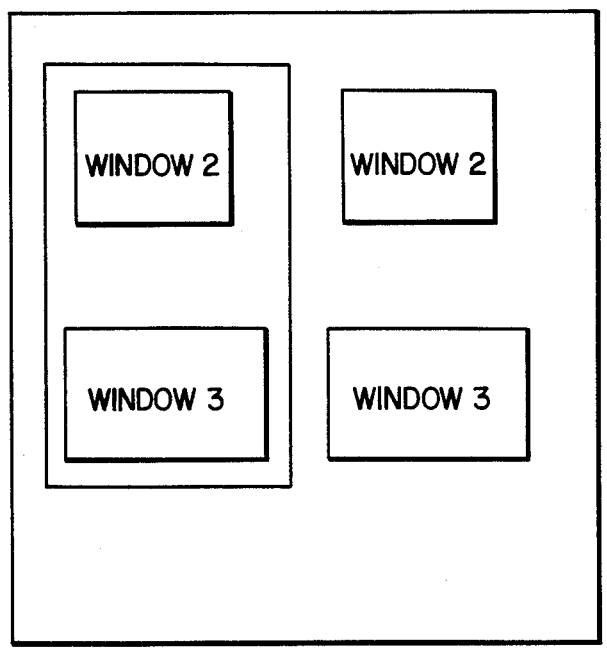

FIG. 5 shows an additional feature of the subject invention. As the user scrolls the newly resized window over the screen to a new location, the original two windows that were reproduced in the newly resized window are conserved and appear to the user as shown. This capability allows additional copies consisting of any combination of windows to be created.

Figure 6:
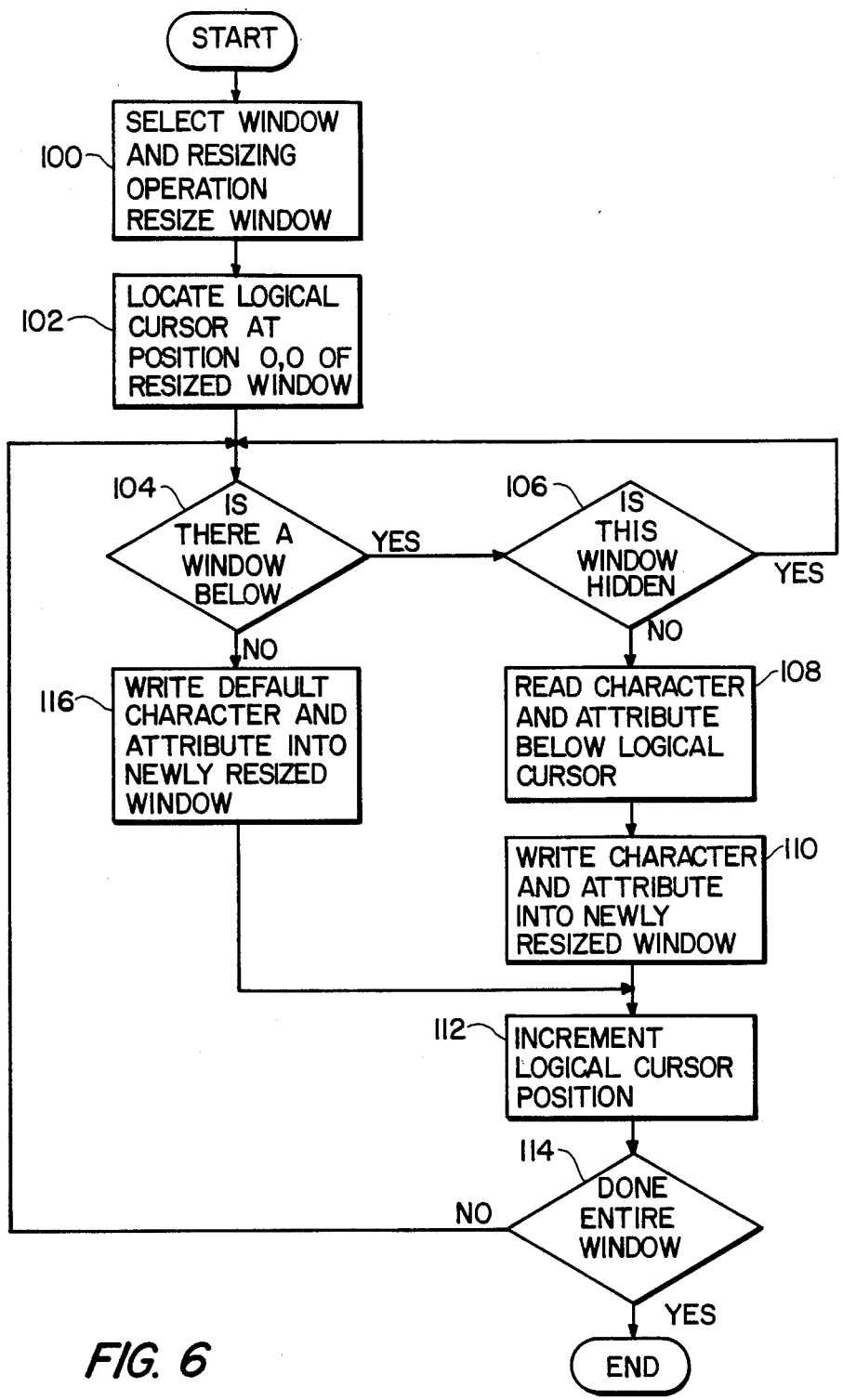
FIG. 6 is the detailed flowchart of the logic of the invention.

A detailed flowchart of the program logic of the window manager is provided in FIG. 6. The creation of an resized window begins when the function is chosen from a menu selection. The selection of the function causes the menu to be removed from the display 10 and the user is prompted to select the window to be enlarged from the display 10. The user then moves the cursor 50 using the mouse 40 to the new X, Y location of one corner to define the resized window as shown in function block 100. As the cursor moves, the boundary of the window changes to incorporate all the data in windows within its resized boundaries as described in the steps below.

Once the selected window is resized, the system locates the logical cursor at position 0,0 of the resized window, as indicated by function block 102. Then a test is made in decision block 104 to determine if there is a window below the resized window. Assuming that there is, a test is next made in decision block 106 to determine if the window below is hidden. If not, then in function block 108, the character and attribute immediately below the logical cursor in the newly resized window are read, and then, in function block 110, the character and attribute are read into the newly resized window at the logical cursor position. This process is continued by incrementing the logical cursor position in function block 112, testing in decision block 114 whether the entire resized window is done, and then looping back to decision block 104. The test in decision block 114 merely keeps track of the positions of the logical cursor, and when the logical cursor has been incremented to every position in the newly resized window, the process ends.

Returning to decision block 104, assume now that the test is negative; that is, no window is found below the newly resized window. In this case, the default, or background, character and attribute are written into the newly resized window at the location of the logical cursor. The process then jumps to function block 112 where the position of the logical cursor is incremented. A similar result obtains when the test in decision block 106 is positive and no further window is found below the hidden window. More specifically, the positive test in decision block 106 means that the window below the newly resized window is hidden. In this case, the process loops back to decision block 104, and no character or attribute information are read or written from the window below. Should there be no further window below the hidden window as determined by the test in decision block 104, then the process goes to function block 116.

If the resized window is scrolled off of the viewable display area, the original windows that were incorporated into the resized window are revealed at their original locations.

To further illustrate the procedure, consider an educational authoring system. The author creates each of the windows of information on the display, like pages of a book, that will be used to teach the student the information. As the windows are created, attribute information such as color, length of display time, user prompts, inputs and sound are linked to areas in the window to assure the proper coordination of the timing of sound and visual stimulus. When the lesson is completed, the author submits the lesson to editors to critique the lesson.

When the editors have finished their critique, their comments must be incorporated into the lesson. In the prior art, this would involve the tedious process of editing the display portions of the windows and relinking any attribute information that might have been associated with portions of the display that were edited. Additionally, any new information that the editors might have thought needed to be added would be created from scratch. The ability to copy or modify information in the windows and conserve the attribute information associated with it did not exist.

The techniques described in the invention allow the author to create a lesson as described before; however, the author is also given the tools to copy a window to incorporate the information from another window into an existing window and conserve the color, sound and other attribute information associated with that window. This function provides the user with a much more powerful and flexible capability for creating and modifying a presentation to meet an author's requirements. To incorporate one or more windows into an existing window, the user simply selects the window to use as the base with the cursor. Then the window is resized by moving the cursor in the direction that the resizing is to take place. As the cursor passes the edge of the original window, its boundary changes to enclose the area indicated by the position of the cursor. The information that is incorporated includes the color, sound, input and prompt attributes associated with the window. In this way, the logic associated with the separate windows is conserved and does not have to be recreated.

Alternatively, if the author just wanted to change the dimensions of the window, he would select the window and move the cursor to resize the window to the desired dimensions without overlapping another window.

While the invention has been described in terms of a preferred embodiment in a specific operating system environment, those skilled in the art will recognize that the invention can be practiced, with modification, in other and different operating systems within the spirit and scope of the appended claims.

Having thus described our invention what we claim as new and desire to secure by Letters Patent is set forth in the following claims:

1. A method of managing a windowing system in a computer display comprising the steps of:
   selecting a window to be resized from a plurality of windows on the computer display;
   inputting dimension data defining resized dimensions of the selected window;
   resizing said selected window on said display according to said inputted dimension data; and
   automatically incorporating data from any other windows which may be below said resized window into said resized selected window while maintaining said other windows as independent entities, said incorporated data not being linked to said other windows.

2. The method of managing a windowing system in a computer display as recited in claim 1 wherein said data from other windows incorporated by said incorporating step includes character and attribute information.

3. The method of managing a windowing system in a computer display as recited in claim 1 further comprising the step of differentiating between hidden and visible windows and only performing said incorporating step from said other windows that are visible.

4. The method of managing a windowing system in a computer display as recited in claim 1 further comprising the step of displaying said other windows as they originally appeared when said resized selected window is scrolled to reveal said other windows which were below said resized selected window.

5. The method of managing a windowing system in a computer display as recited in claim 1 wherein the step of incorporating is performed by the following steps:
   incrementing a logical cursor to each location within the area of said selected resized window;
   checking for a visible window below the location of said logical cursor;
   reading character and attribute information from the corresponding location of said logical cursor in a visible window; and
   writing the read character and attribute information into said selected resized window.

6. The method of managing a windowing system in a computer display as recited in claim 5 further comprising the step of maintaining windows below said selected resized window in their original condition on the display so that, as said selected resized window is scrolled, said windows will be revealed as they originally appeared on said display.

* * * * *